United States Patent Office 3,473,945
Patented Oct. 21, 1969

3,473,945
COATED THERMOSENSITIVE COPYING SHEET
Kiyoshi Futaki, Kyoto, Japan, assignor to Mitsubishi Paper Mills, Ltd., Tokyo, Japan, a corporation of Japan
No Drawing. Filed Aug. 30, 1966, Ser. No. 575,944
Claims priority, application Japan, Aug. 30, 1965, 40/52,524
Int. Cl. B41m 5/18
U.S. Cl. 117—36.8
4 Claims

ABSTRACT OF THE DISCLOSURE

A thermo copying sheet which comprises a flexible base sheet coated with a heat sensitive composition comprising a uniform dispersion mixture consisting of (a) a heterocyclic hydrazine derivative having the general formula

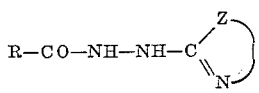

wherein R is selected from the group consisting of hydrogen, a hydrocarbon group and a heterocyclic residue and further the substitution products thereof with other suitable derivative groups and Z represents a residual atomic group of required bonding for the formation of ring, and (b) an iron salt of an organic acid having 7 to 26 carbon atoms. The heat sensitive composition may also contain a guanidine.

The present invention relates to a thermo copying material. Further, it relates to a thermo copying material which is coated with a heat sensitive substance consisting of a heterocyclic hydrazine derivative and the iron salt of an organic acid.

The ordinary photographs are prepared by a process which makes an image by utilizing the visible light or ultra-violet light. In contrast to this, the so-called thermographic process which prepares the copies of documents or drawings by using the intensive infrared light. This thermographic process has recently become very common and the principle thereof is briefly explained below.

In general, the thermo-copying material is prepared by thinly coating a thin sheet or film with a heat sensitive substance which is colored due to sudden chemical reaction thereof above a definite temperature. The obtained thermo copying material is kept in close contact with a printed, type-written or hand-written manuscript and is exposed to intensive infrared light for a relatively short time.

When the portions of dark or black colored letters or drawings in the manuscript are exposed to the infrared light, a sharp temperature rise takes place in the said portions due to the absorption of infrared light. The portions of the thermo copying material in contact with the said heated portions are then heated by the conduction of heat. In thus heated portions, the chemical reaction of heat sensitive substance takes place and causes coloring. On the other hand, the infrared light almost transpasses or is reflected by the unwritten portions in the manuscript and therefore no temperature rise occurs. Consequently, the portions of the thermo copying material in contact with the unwritten portions do not color because the chemical reaction of heat sensitive substance is absent. Thus, the copied image is obtained on the thermo copying material from the manuscript.

According to the above description, it may be clear that the suitability of thermo copying material is governed by many factors. One is that, when the thermo copying material is heated to a definite temperature, the chemical reaction of heat sensitive substance in the thermo copying material takes place suddenly and thereby it is colored. Another is that no chemical reaction of heat sensitive substance in the thermo copying material occurs below a definite temperature and therefore coloring is absent. Further, it is desirable for practical uses that the said definite temperature required for the coloring of the thermo copying material due to the said chemical reaction is not so high. It is, however, not preferable to use such a thermo copying material as colors at very low temperatures, for example, normal temperature. Furthermore, the thermo copying material is preferably as colorless as possible, before the coloring, while it is desirable that the obtained color density of the thermo copying material is high and the nuance thereof is favorable. It is considerably difficult to select the suitable combination of heat sensitive substances because the combination thereof is delicately related with the said requirements.

There have so far been published many proposals for thermo copying material. However, all the conventional heat sensitive substances are fairly colored from the beginning. Further, the coloring of the conventional thermo copying materials is weak and the obtained image is not sharp and unstable, so there are few satisfactory thermo copying materials.

The object of the present invention is to provide a heat sensitive substance eliminating the said defects of the conventional heat sensitive substances. Further, another object of the present invention is to provide a thermo copying material, wherein the base of the thermo copying material is of nearly white and light color, does not discolor during preservation at normal temperature, and is stable under exposure to visible light, and a very sharp and deep-colored image is obtained by printing.

The heat sensitive substance according to the present invention is prepared by mixing a heterocyclic hydrazine derivative with the iron salt of an organic acid. When the heat sensitive substance of nearly white and light color is heated, the sudden chemical reaction thereof takes place at a definite temperature between 50° C. and 130° C. and thereby it is colored to various colors such as violet, blue, green and brown, depending upon the composition of the heat sensitive substance. The said reaction mechanism has not been, however, understood at all or described in any reference, either. There are known similar substances of perfect uncoloring. Therefore, the present invention can hardly be expected from the conventional knowledges.

According to the present invention, the heat sensitive chemical substance constituting the thermo copying material consists of two components. One component according to the present invention is a heterocyclic hydrazine derivative having the following general formula,

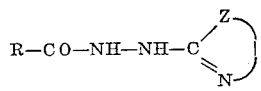

where R is selected from the group consisting of hydrogen, a hydrocarbon group and a heterocyclic residue and further the substitution product thereof with other suitable derivative group, and Z represents the residual atomic group of required bonding for the formation of the ring. The concrete examples of the heterocyclic hydrazine derivative according to the present invention are 2-benzoyl-hydrazino-benzothiazole, 2 - (p-chlorobenzoyl)hydrazino-benzothiazole, 2 - formylhydrazino-benzothiazole, 2-benzoylhydrazino-benzooxazole, 2 - (m-nitrobenzoyl)hydrazinobenzooxazole, 2 - acetylhydrazino - benzooxazole, 2 - formylhydrazino-benzooxazole, 2 - benzoylhydrazino-thiazoline, 2 - acetylhydrazino - 4 - phenyl-thiazole, 2 - benzoylhydrazino-pyridine, 2 - benzoylhydrazino-pyrimidine, 2 - (benzoylhydrazino)-quinoline, 2 - (iso-nicotilhydrazino)-pyrimidine and the like. And are also available heterocyclic hydrazine derivatives including the ring of imidazoline, imidazole, oxazoline, oxazole, selenazole, benzoselenazole, oxadiazole, thiadiazole, triazole, tetrazole, triazine and the like. The said examples do not, however, limit the scope of the present invention.

Another component of the heat sensitive chemical substance according to the present invention is the iron salt of an organic acid having 7 to 26 carbon atoms, for example, pelargonic acid, capric acid, undecylic acid, lauric acid, myristic acid, palmitic acid, stearic acid, eurucic acid, behenic acid, naphthenic acid, 11-bromundecanic acid, benzoic acid, anisic acid, 4-cetoxybenzoic acid, 4-octadecylbenzoic acid, phthalic acid-monooctadecyl amide and the like. In accordance with the preparing condition of these organic acids, they can be used, even being intermixed with free acid or alkali salt in the said iron salt.

The said heterocyclic hydrazine derivative and the iron salt of an organic acid according to the present invention can easily be synthesized by the already-known process described in the common references or similar processes.

When a certain combination of said two heat sensitive components is further added with an organic base, for example, guanidines, the coloring speed of the heat sensitive substance is remarkably accelerated under heating and the coloring of deep color is obtained. In such a case as the above, it is advantageous to add the said two heat sensitive components with guanidine. The suitable organic base is the molecular compound of various organic salts or bases capable of accepting the proton, and is solid at room temperature. The organic base such as guanidines is especially effective. Examples of these compounds are 1,2 - dibenzyl-guanidine, 1 - phenyl - 2 - (p-bromphenyl)-guanidine, 1 - phenyl - 2 - (p-ethoxyphenyl)-guanidine, 1,2 - diphenyl-guanidine, 1 - benzyl - 2 - (p-ethoxyphenyl)-guanidine, 1,2,3 - triphenyl-guanidine, 1,2 - diphenyl - 3 - tolyl-guanidine, 1-benzyl - 2 - (β-naphthyl)-guanidine, 1,2 - diphenyl - 3 - benzyl-guanidine, 1,2 - diphenyl - 3 - cyclohexyl-guanidine, 1,2 - dicyclohexyl-guanidine, 2 - guanido-benzoimidazole and the like.

As the binder sticking the said heat sensitive substance to the support, various well-known binders are available, for example, a cellulose derivative such as methylcellulose, ethylcellulose, acetylcellulose, and hydroxyethylcellulose, polyvinyl chloride, polyvinyl acetate, polyvinyl alcohol, polyacryl amide, polyacryl acid ester, polyvinyl butyral, polystyrene, polyvinyl ether and copolymers thereof, gelatin, polyamide resin, silicon resin, petroleum resin, terpene resin, ketone resin, coumarone resin, cyclized rubber and the like. These high polymer substances are used, being dissolved in a suitable solvent such as water, alcohols, ketones, esters, hydrocarbons, and halogen compounds. Or, these high polymer substances are used, being dispersed in the form of emulsion or paste in a medium which does not dissolve the high polymer substances.

Suitable supports for the thermo copying material according to the present invention are thin leaf-like paper, cellophane, polyester film and the like.

Preparation of the thermo copying material according to the present invention is as follows.

A heterocyclic hydrazine derivative and the iron salt of an organic acid are separately ground into solvents which hardly dissolve them, for preparing the suspensions thereof. Then, both the liquids are sufficiently admixed in a solution containing the binder or other binding material. Further, this solution may freely be added with guanidines. Thus obtained heat sensitive substance is thinly coated on the support and dried at temperatures below about 40° C. The obtained thermo copying material is nearly white, but slightly colored (faint yellow or faint red) due to the presence of the iron salt.

The copying of the thermo copying material according to the present invention is carried out by thermal action of infrared light, as described in the following procedures.

(1) The face (rear face) of the thermo copying material on which the heat sensitive substance is not coated is put closely on a printed or written manuscript. The heat sensitive face of the thermo-copying material is exposed to intensitive infrared light. The printed or written portions of the manuscript selectively absorb the infrared light and thereby is heated. Through the support adhering thereto, the said heat is conducted to the heat sensitive layer. Thus, the chemical change of the heat sensitive substance produces the copied positive image of dark-blue or pure black on the heat sensitive portion. By increasing the intensity of infrared irradiation from the energy source, the required time of irradiation is shortened and the obtained image is sharpened. This process is of reflection-type printing system and, if the thermo copying material is made of thin support, is of universal type capable of copying from double-sided printed matter, pasteboard, documents written in black or other ink well absorbing the infrared light and manuscripts written with pencil.

(2) The heat sensitive layer face of the thermo copying material is put closely on the rear face of a manuscript of printed or written paper. Next, the front face of the manuscript is exposed to intensitive infrared light. This process corresponds to the transmission-type printing in the copying process using the ordinary light, and thereby the positive erected image can easily be obtained. This process is capable of copying from not only single-sided documents but also double-sided printed matters such as newspapers, that is, only the exposed image to infrared light is copied in the double-sided printing, but neither the printing nor letters in the rear face is copied. Infrared light is reflected by blank sheet portions corresponding to the printing and letters in the rear face, which therefore are not heated sufficiently. As the feature of this process, it is possible to make the copy of double-sided printed matter or thermo copying sheet of thick support. However, if the sheet of manuscripts is especially thick, the copied image disadvantageously becomes indistinct.

(3) In the operation in the said (1) and (2), if the heat sensitive layer and the rear face thereof are put closely on a manuscript reversely to the said case and are exposed to infrared light, the right-to-left inverted image is obtained. If this image can be perceived from the rear face, the right erected image is observed. When the transparency of the support is higher, more distinct images can be obtained by this process.

On the thermo copying material according to the present invention, an image is copied not only by the contact copying process but also by using a heated metallic pen or stamp.

The base of thermo copying material according to the present invention is of nearly white and light color, is not discolored during preservation at normal temperature and is stable under exposure to light. Further, the very sharp image of dark color can be obtained on the said thermo copying material by printing.

The copied image obtained on the thermo copying material according to the present invention by the said process is as it is sufficiently stable at normal temperature and, being exposed to sun light, is hardly changed without necessity of fixing operation.

Following examples of the present invention are given for the purpose of illustration only.

EXAMPLE 1

100 g. of 2-formylhydrazino-benzothiazole and 40 g. of petroleum resin are suspended in 500 ml. of petroleum and are ground in a ball mill for 2 days. Separately, 50 g. of iron stearate and 20 g. of petroleum resin are suspended in 250 ml. of petroleum and are ground in a ball mill for 2 days. Both the liquids are well intermixed together below 150° C., thinly coated on a thin paper of about 30 g./m.² and dried below 40° C. According to the said operation, the copy of a printed matter on the thermo copying material is obtained by the irradiation of an infrared light lamp. The base of the copy thus obtained is nearly white and the image is stable and dark green. The said formylhydrazino-benzothiazole has the melting point of 216°–216.5° C. (decomposition) and is of colorless crystal. It can easily be synthesized by the ordinary process for the formulation of 2-hydrazino-benzothiazole with formic acid. According to the process described in the specification of Japanese Patent No. 424,622, iron stearate is obtained as the precipitate by mixing the solution of sodium stearate with the solution of iron chloride.

EXAMPLE 2

The similar thermo copying paper as in Example 1 is obtained by the same procedure as in Example 1, except that the dispersion medium is water instead of petroleum and the binder is polyvinyl alcohol instead of petroleum resin.

EXAMPLE 3

4 kg. of 2-formylhydrazino-benzooxazole, 1.2 kg. of terpene resin, 0.4 kg. of zinc oxide and 16 l. of petroleum are mixed together and are ground for 1 hour in a vibrating ball mill, to form the suspension thereof. Separately, the mixture of 1 kg. of stearic acid, 0.3 kg. of terpene resin and 4 l. of petroleum is ground for 1 hour to form the suspension thereof. Both the liquids are well intermixed together. The obtained liquid is thinly coated on the Japanese paper of about 25 g./m.² and dried below 40° C. On the thermo copying paper thus obtained, the sharp image of dark blue on the white ground can be obtained by the well-known infrared light copying technique.

EXAMPLE 4

The same procedure as in Example 3 is carried out, except that iron behenate or iron palmitate is used instead of iron stearate. Thus, the similar excellent thermo copying paper as in Example 3 is easily obtained.

EXAMPLE 5

The mixture of 100 g. of 2-formylhydrazino-4-phenyl thiazole, 20 g. of ethylcellulose and 300 ml. of toluene is ground in a ball mill, to form the suspension thereof. Separately, the mixture of 50 g. of iron behenate, 10 g. of ethylcellulose and 150 ml. of toluene is ground in a ball mill, to form the suspension thereof. Both the liquids are well intermixed below 5° C. The obtained liquid is thinly coated on 25 micron thick polyester film, and dried. On this thermo copying film, the stable image of dark and deep green on the semitransparent ground is obtained by the well-known infrared light copying process.

EXAMPLE 6

The mixture of 100 g. of 2-acetohydrazino-4-phenyl-thiazole (synthesis: Yakugaku zasshi, vol. 73, p. 535), 30 g. of terpene resin, 50 g. of diphenyl guanidine and 500 ml. of petroleum is ground in a ball mill, to form the suspension thereof. Separately, the mixture of 30 g. of iron benzoate, 10 g. of terpene resin and 200 ml. of petroleum is ground in a ball mill, to form the suspension thereof. Both the liquids are well intermixed together. The liquid thus obtained is thinly coated on a thin paper and dried. On this thermo copying paper, the stable image of dark green on the nearly white ground is obtained by the well-known process of infrared light copying.

EXAMPLE 7

The mixture of 100 g. of 2-benzoylhydrazino-thiazoline, 20 g. of cyclized rubber and 400 ml. of petroleum is ground in a ball mill, to form the suspension thereof. Separately, the mixture of 30 g. of iron stearate, 6 g. of cyclized rubber and 150 ml. of petroleum is ground in a ball mill, to form the suspension thereof. Both the liquids are well intermixed together. The obtained liquid is thinly coated on a thin paper and dried. The stable image of deep and dark violet on the faint by colored ground is obtained by the well-known process of infrared light copying.

EXAMPLE 8

The same procedure as in Example 7 is carried out, except that 2-benzoylhydrazino-oxazoline is used instead of 2-benzoylhydrazino-thiazoline. Similar excellent thermo copying paper as in Example 7 is obtained. On the prepared paper, the stable image of thick blue is obtained by infrared light copying.

EXAMPLE 9

The same procedure as in Example 7 is carried out, except that 2-benzoylhydrazino-pyrimidine is used instead of 2-benzoylhydrazino-thiazoline. Similar excellent thermo copying paper as in Example 7 is obtained. On the prepared paper, the copied image of violet-blue is obtained by infrared light copying.

EXAMPLE 10

The same procedure as in Example 6 is carried out, except that 2-benzoylhydrazino-pyrimidine is used instead of 2-benzoylhydrazino-thiazoline. Similar excellent thermo copying paper as in Example 6 is prepared. The copied image of dark green is obtained on this thermo copying paper by infrared light copying.

What is claimed is:
1. A thermo copying sheet which comprises a flexible base sheet coated with a heat sensitive composition comprising a uniform dispersion mixture consisting of (a) a heterocyclic hydrazine derivative having the general formula

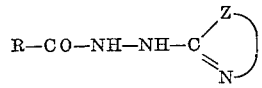

wherein R is selected from the group consisting of hydrogen, a hydrocarbon group and a heterocyclic residue and further the substitution product thereof with other suitable derivative group and Z represents the residual atomic group of required bonding for the formation of ring, and (b) an iron salt of an organic acid having 7 to 26 carbon atoms, the weight ratio of said hydrazine derivative and iron salt being 20/80–95/5.

2. A thermo copying sheet according to claim 1 wherein the heat sensitive composition is present on a paper base as a coating dispersed with a binder.

3. A thermo copying sheet according to claim 1 wherein the heat sensitive composition contains also a guanidine.

4. A thermo copying sheet according to claim 3 wherein the heat sensitive composition is present on a paper base as a coating dispersed with a binder.

References Cited

UNITED STATES PATENTS

| 3,157,526 | 11/1964 | Johnson et al. | 117—36.8 |
| 3,328,191 | 6/1967 | Hirsch | 117—36.8 |

FOREIGN PATENTS

| 974,345 | 11/1964 | Great Britain. |

MURRAY KATZ, Primary Examiner

U.S. Cl. X.R.

106—25; 117—138.8, 155; 260—41